US012169722B2

(12) United States Patent
Tagashira et al.

(10) Patent No.: US 12,169,722 B2
(45) Date of Patent: Dec. 17, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Nobuhiro Tagashira, Chiba (JP); Takami Eguchi, Tokyo (JP); Ayuta Kawazu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 291 days.

(21) Appl. No.: 17/556,806

(22) Filed: Dec. 20, 2021

(65) Prior Publication Data

US 2022/0113990 A1 Apr. 14, 2022

Related U.S. Application Data

(63) Continuation of application No. PCT/JP2020/024685, filed on Jun. 24, 2020.

(30) Foreign Application Priority Data

Jun. 27, 2019 (JP) ................................. 2019-120325

(51) Int. Cl.
*G06F 9/445* (2018.01)
*G06F 9/4401* (2018.01)

(52) U.S. Cl.
CPC ........ *G06F 9/44589* (2013.01); *G06F 9/4401* (2013.01); *G06F 9/44505* (2013.01)

(58) Field of Classification Search
USPC ......................................................... 717/126
See application file for complete search history.

(56) References Cited

U.S. PATENT DOCUMENTS

| 10,956,176 B2 * | 3/2021 | Lin ......................... G06F 21/51 |
| 2008/0127161 A1 * | 5/2008 | Atas ........................ G06F 21/57 |
| | | 713/100 |
| 2008/0229426 A1 * | 9/2008 | Saitoh ..................... G06F 21/10 |
| | | 726/26 |
| 2011/0225653 A1 * | 9/2011 | Maeda ..................... G06F 21/57 |
| | | 709/224 |
| 2012/0084557 A1 * | 4/2012 | Futa ........................ G06F 21/57 |
| | | 726/27 |
| 2012/0324238 A1 * | 12/2012 | Senda ..................... G06F 21/57 |
| | | 713/189 |
| 2019/0171442 A1 * | 6/2019 | Machida ............. H04L 67/1031 |

FOREIGN PATENT DOCUMENTS

| JP | 2010182196 A | 8/2010 |
| JP | 2018080775 A | 5/2018 |
| JP | 2019003275 A | 1/2019 |
| JP | 2019012442 A | 1/2019 |

* cited by examiner

*Primary Examiner* — Qing Chen
*Assistant Examiner* — Clint Thatcher
(74) *Attorney, Agent, or Firm* — Canon U.S.A., Inc. IP Division

(57) ABSTRACT

An information processing apparatus comprising a verification unit configured to verify, among a plurality of divided parts of software to be started up, a part of software to be started up next and setting data relating to startup of the part of software to be started next.

8 Claims, 15 Drawing Sheets

FIG.5A

| 501 | 502 |
|---|---|
| /bin/cat | d5fbf0c99df41629ea6ed4babe6f3386eb7a8d4c |
| /lib/libc.so | 1c116100d09910167ce6d02f778269f0fb50c572 |
| /lib/libm.so | bc4f3c579073388d2a26c30474141ce5fb5aa36c |
| /etc/startup/startup.conf | 989b6c8d929537490b426a66acd8f52d59c519c0 |
| /etc/startup/ui.conf | b9c45ff6c344ab4ab986a8ef8e56e8604a15b214 |

FIG.5B

| NAME | STARTUP CONTROL UNIT | ~511 |
|---|---|---|
| EXECUTION LOCATION | /bin | ~512 |
| PROGRAM FILE NAME | /bin/startup | ~513 |
| PRIORITY | INITIAL STARTUP | ~514 |
| DEPENDENCE | NONE | ~515 |

| NAME | OPERATION CONTROL UNIT | ~511 |
|---|---|---|
| EXECUTION LOCATION | /usr/bin | ~512 |
| PROGRAM FILE NAME | /usr/bin/ui | ~513 |
| PRIORITY | INITIAL STARTUP | ~514 |
| DEPENDENCE | AUTHENTICATION UNIT | ~515 |

FIG.6A

| NAME | STARTUP CONTROL UNIT | 401a |
|---|---|---|
| PRIORITY | INITIAL STARTUP | |
| DEPENDENCE | NONE | |

| NAME | NETWORK CONTROL UNIT | 407a |
|---|---|---|
| PRIORITY | INITIAL STARTUP | |
| DEPENDENCE | VERIFICATION-AT-EXECUTION UNIT | |

| NAME | IMAGE PROCESSING UNIT | 404a |
|---|---|---|
| PRIORITY | INITIAL STARTUP | |
| DEPENDENCE | JOB CONTROL UNIT | |

| NAME | DATA STORAGE UNIT | 402a |
|---|---|---|
| PRIORITY | INITIAL STARTUP | |
| DEPENDENCE | STARTUP CONTROL UNIT | |

| NAME | TCP/IP CONTROL UNIT | 408a |
|---|---|---|
| PRIORITY | INITIAL STARTUP | |
| DEPENDENCE | NETWORK CONTROL UNIT | |

| NAME | PRINTING PROCESSING UNIT | 405a |
|---|---|---|
| PRIORITY | INITIAL STARTUP | |
| DEPENDENCE | JOB CONTROL UNIT | |

| NAME | VERIFICATION-AT-EXECUTION UNIT | 413a |
|---|---|---|
| PRIORITY | INITIAL STARTUP | |
| DEPENDENCE | DATA STORAGE UNIT | |

| NAME | JOB CONTROL UNIT | 403a |
|---|---|---|
| PRIORITY | INITIAL STARTUP | |
| DEPENDENCE | VERIFICATION-AT-EXECUTION UNIT | |

| NAME | READING CONTROL UNIT | 406a |
|---|---|---|
| PRIORITY | INITIAL STARTUP | |
| DEPENDENCE | JOB CONTROL UNIT | |

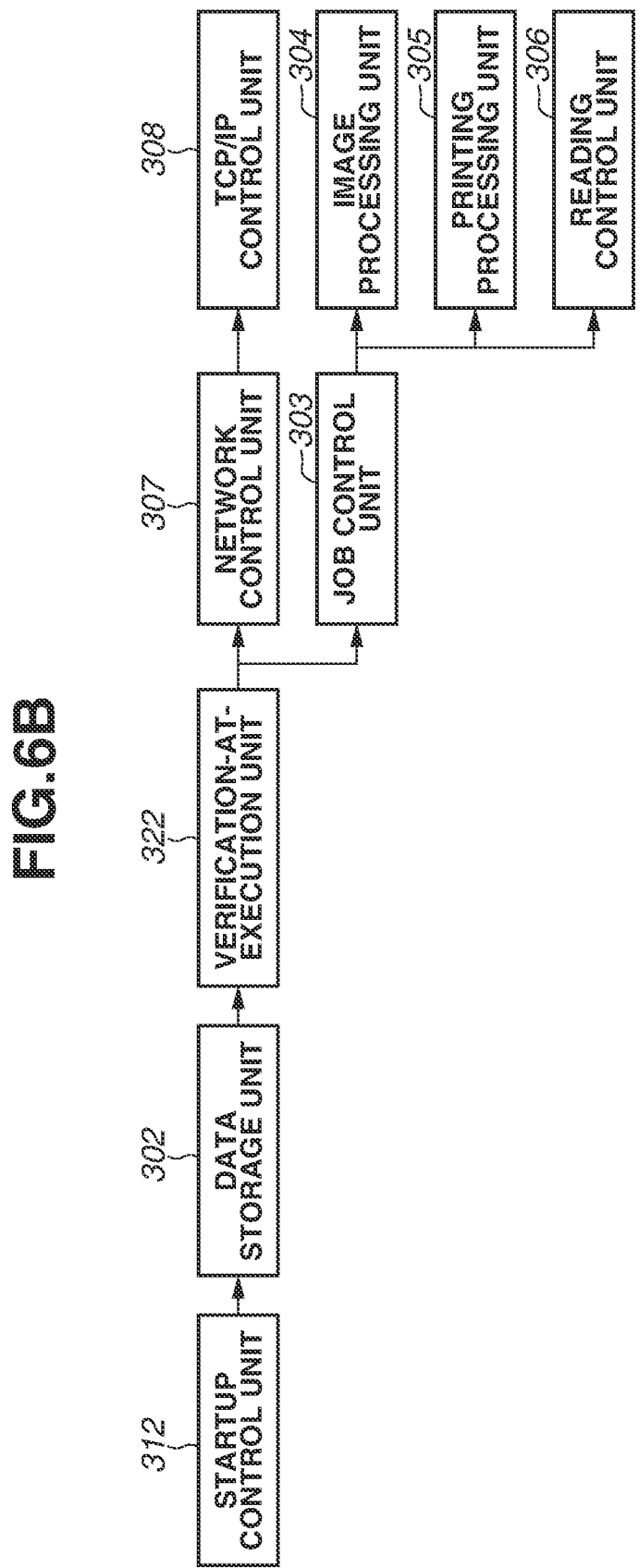

INFORMATION PROCESSING APPARATUS, INFORMATION PROCESSING METHOD, AND STORAGE MEDIUM

CROSS-REFERENCE TO RELATED APPLICATIONS

This application is a Continuation of International Patent Application No. PCT/JP2020/024685, filed Jun. 24, 2020, which claims the benefit of Japanese Patent Application No. 2019-120325, filed Jun. 27, 2019, both of which are hereby incorporated by reference herein in their entirety.

BACKGROUND OF THE INVENTION

Field of the Invention

The present invention relates to an information processing apparatus verifying setting data relating to startup of a part of software, an information processing method, and a storage medium.

Background Art

Attacks such as tampering with and abuse of software controlling an apparatus by a third party have been an issue. If the software is abused, information assets may be stolen or the software may be used as a steppingstone to attack other systems, which may cause serious damage to an owner of the apparatus. To prevent such attacks, a method for verifying that the software has not been tampered with at use of the apparatus has been developed.

Japanese Patent Application No. 2018-080775 discusses the verification at startup in which an apparatus is started up "after verification of software". In an apparatus having two functions of the verification at startup and the verification at execution in which software executed at a certain timing is "verified before execution", the software on which the verification at execution is to be performed is verified by the verification at startup. This enables linking of verification results from the startup of the apparatus to the verification at execution, whereby enabling use of the software controlling the apparatus with high reliability.

On the other hand, due to increasing functionality and complexity of an apparatus, a configuration is commonly used in which software is divided by a function unit, the divided parts of software are arranged in the apparatus, and each of the divided parts of software is executed as necessary. To divide the software, there are a configuration in which a plurality of storage media is mounted on the apparatus and different parts of software are arranged in the respective storage media, and a configuration in which a file system is constructed on a storage medium and different parts of software are arranged in respective files. A computer and an embedded device generally implement complicated software functionality by using both of the configurations. Software startup control suitable for characteristics of each apparatus is required because the software is divided into the plurality of parts. To meet such requirements, a mechanism (e.g., launched and systemd) that can implement flexible startup control, such as serial startup or parallel startup, has been implemented.

CITATION LIST

Patent Literature

PLT 1: Japanese Patent Application No. 2018-080775

However, in Japanese Patent Application No. 2018-080775, influence of the flexible startup control mechanism is not considered. Thus, the flexibility may be abused, and unauthorized software may be embedded in a time gap between verification processing of the verification-at-execution software by the verification at startup and execution of the verification-at-execution software.

The present invention is directed to a technique that improves reliability of software controlling whole of an apparatus by enhancing validity of linkage of the verification at startup and the verification at execution, and enables the apparatus to be securely used.

SUMMARY OF THE INVENTION

According to an aspect of the present invention, an information processing apparatus comprising a verification unit configured to verify, among a plurality of divided parts of software to be started up, a part of software to be started up next and setting data relating to startup of the part of software to be started next.

Further features of the present invention will become apparent from the following description of exemplary embodiments with reference to the attached drawings.

BRIEF DESCRIPTION OF THE DRAWINGS

FIG. 5A illustrates examples of a correct value list and startup control data according to the exemplary embodiment of the present invention.

FIG. 5B illustrates examples of a correct value list and startup control data according to the exemplary embodiment of the present invention.

FIG. 6A illustrates an example of the startup control data and a startup order according to the exemplary embodiment of the present invention.

FIG. 6B illustrates an example of the startup control data and a startup order according to the exemplary embodiment of the present invention.

DESCRIPTION OF THE EMBODIMENTS

First Exemplary Embodiment

A first exemplary embodiment of the present invention is described below with reference to the drawings. In the present exemplary embodiment, software verification processing at startup of a system is described. The present exemplary embodiment is described by using a multifunctional peripheral (MFP) as an example; however, the technique according to the exemplary embodiment of the present invention is applicable to any information processing apparatus other than the MFP.

Figure 1:
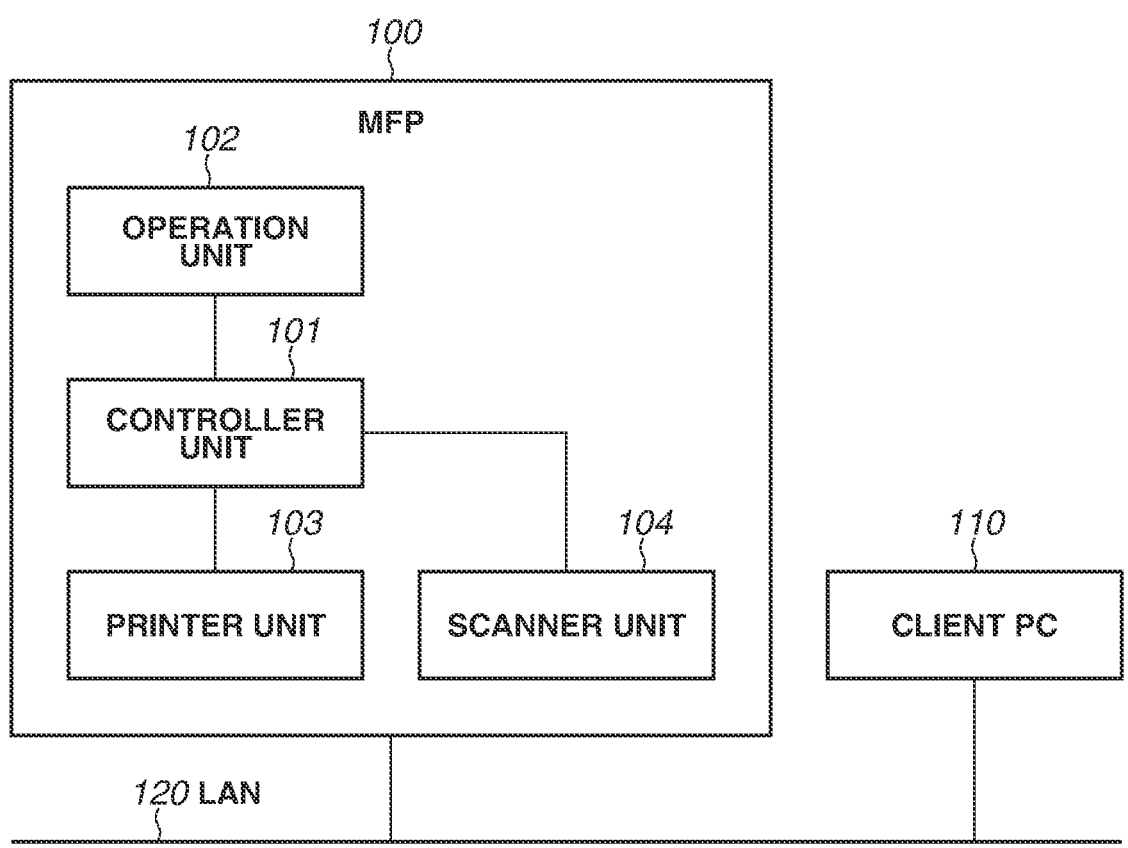
FIG. 1 is a block configuration diagram illustrating a connection mode between a multifunctional peripheral (MFP) and a client personal computer (PC) according to an exemplary embodiment of the present invention.

FIG. 1 is a block diagram illustrating a connection mode between the MFP and a client personal computer (PC) according to the exemplary embodiment of the present invention. An MFP 100 and a client PC 110 are connected via a local area network (LAN) 120. The MFP 100 includes an operation unit 102 that receives input from and performs output to a user. The MFP 100 includes a printer unit 103 that outputs electronic data on a paper medium. The MFP 100 includes a scanner unit 104 that reads a paper medium to generate electronic data. The operation unit 102, the printer unit 103, and the scanner unit 104 are connected to a controller unit 101 and implement functions of the MFP under the control of the controller unit 101. The client PC 110 performs processing such as transmission of a print job to the MFP 100.

Figure 2:
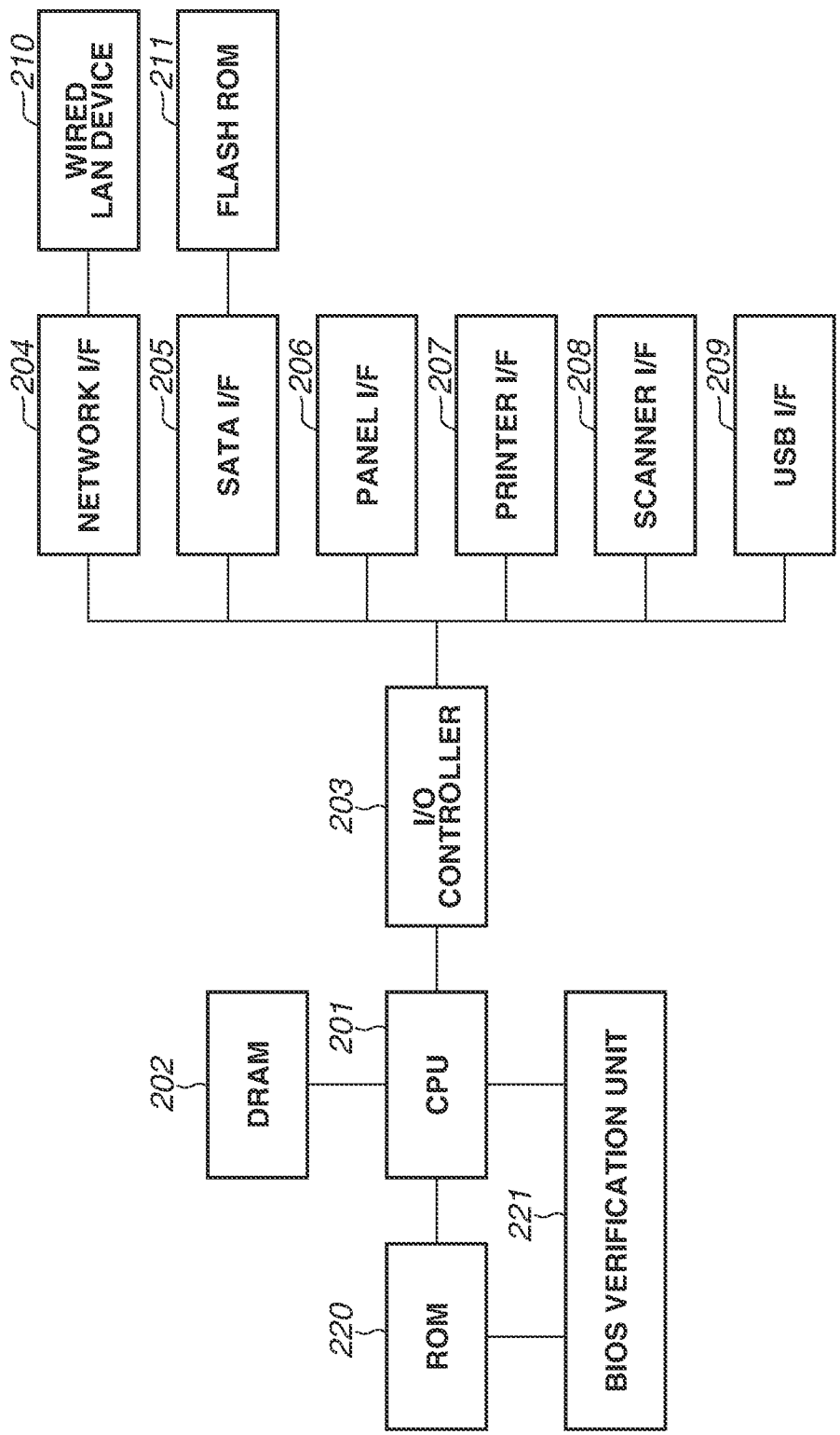
FIG. 2 is an internal configuration diagram of a controller unit of the MFP according to the exemplary embodiment of the present invention.

FIG. 2 is a block diagram illustrating detail of the controller unit 101 of the MFP 100. A central processing unit (CPU) 201 performs main calculation processing of the controller unit 101. The CPU 201 is connected to a dynamic random access memory (DRAM) 202 via a bus. The DRAM 202 is used as a work memory for temporarily storing program data representing a calculation command in a calculation process performed by the CPU 201 and data to be processed, by the CPU 201. The CPU 201 is connected to an input/output (I/O) controller 203 via the bus. The I/O controller 203 receives input from and performs output to various kinds of devices by following an instruction from the CPU 201. A serial advanced technology attachment (SATA) interface (I/F) 205 is connected to the I/O controller 203, and a Flash read only memory (ROM) 211 is connected to the SATA I/F 205. The CPU 201 uses the Flash ROM 211 to permanently stores programs for implementing the functions of the MFP, various kinds of setting data, and document files. A network I/F 204 is connected to the I/O controller 203. A wired LAN device 210 is connected to the network I/F 204. The CPU 201 controls the wired LAN device 210 via the network I/F 204, thereby implementing communication on the LAN 120. A panel I/F 206 is connected to the I/O controller 203, and the CPU 201 implements input and output for the user on the operation unit 102 via the panel I/F 206. A printer I/F 207 is connected to the 170 controller 203, and the CPU 201 implements paper medium output processing using the printer unit 103 via the printer 207. A scanner I/F 208 is connected to the I/O controller 203, and the CPU 201 implements document reading processing using the scanner unit 104 via the scanner I/F 208. A universal serial bus (USB) OF 209 is connected to the I/O controller 203, and the I/O controller 203 controls any apparatus connected to the USB I/F 209. A ROM 220 is connected to the CPU 201 via the bus, and stores a control program that implements a basic input output system (BIOS). A BIOS verification unit 221 is connected to the ROM 220 and the CPU 201 via the bus, and verifies BIOS data stored in the ROM 220 and instructs the CPU 201 to start up BIOS. Note that the BIOS verification unit 221 is hardware, and BIOS verification is hardware verification. To prevent the bus connecting the BIOS verification unit 221 and the CPU 201 from being altered by a malicious third party, the BIOS verification unit 221 and the CPU 201 are implemented on the same chip or implemented in a configuration equivalent thereto, and cannot be physically observed from outside. In the first exemplary embodiment, a configuration is considered in which a control mechanism of the BIOS verification unit 221 is implemented by hardware as an integrated circuit; however, a configuration may also be considered in which elements such as a dedicated CPU and a ROM storing control software are mounted on the same chip and are unchangeable after being manufactured.

In a case where a copy function is performed, the CPU 201 loads program data from the Flash ROM 211 into the DRAM 202 via the SATA I/F 205. The CPU 201 detects a copy instruction issued by the user on the operation unit 102 via the panel I/F 206, based on the program loaded into the DRAM 202. When detecting the copy instruction, the CPU 201 receives a document as image data from the scanner unit 104 via the scanner I/F 208, and stores the image data in the DRAM 202. The CPU 201 performs color conversion processing and the like suitable for output on the image data stored in the DRAM 202. The CPU 201 transfers the image data stored in the DRAM 202 to the printer unit 103 via the printer I/F 207, and performs the paper medium output processing.

In a case where page description language (PDL) printing is performed, the client PC 110 issues a print instruction via the LAN 120. The CPU 201 loads program data from the Flash ROM 211 to the DRAM 202 via the SATA I/F 205, and detects the print instruction via the network I/F 204 based on the program loaded into the DRAM 202. When detecting a PDL transmission instruction, the CPU 201 receives print data via the network I/F 204, and stores the print data in the Flash ROM 211 via the SATA I/F 205. After storage of the print data is completed, the CPU 201 loads the print data stored in the Flash ROM 211 into the DRAM 202 as image data. The CPU 201 performs color conversion processing and the like suitable for output on the image data stored in the DRAM 202. The CPU 201 transfers the image data stored in the DRAM 202 to the printer unit 103 via the printer I/F 207, and performs the paper medium output processing.

Figure 3:
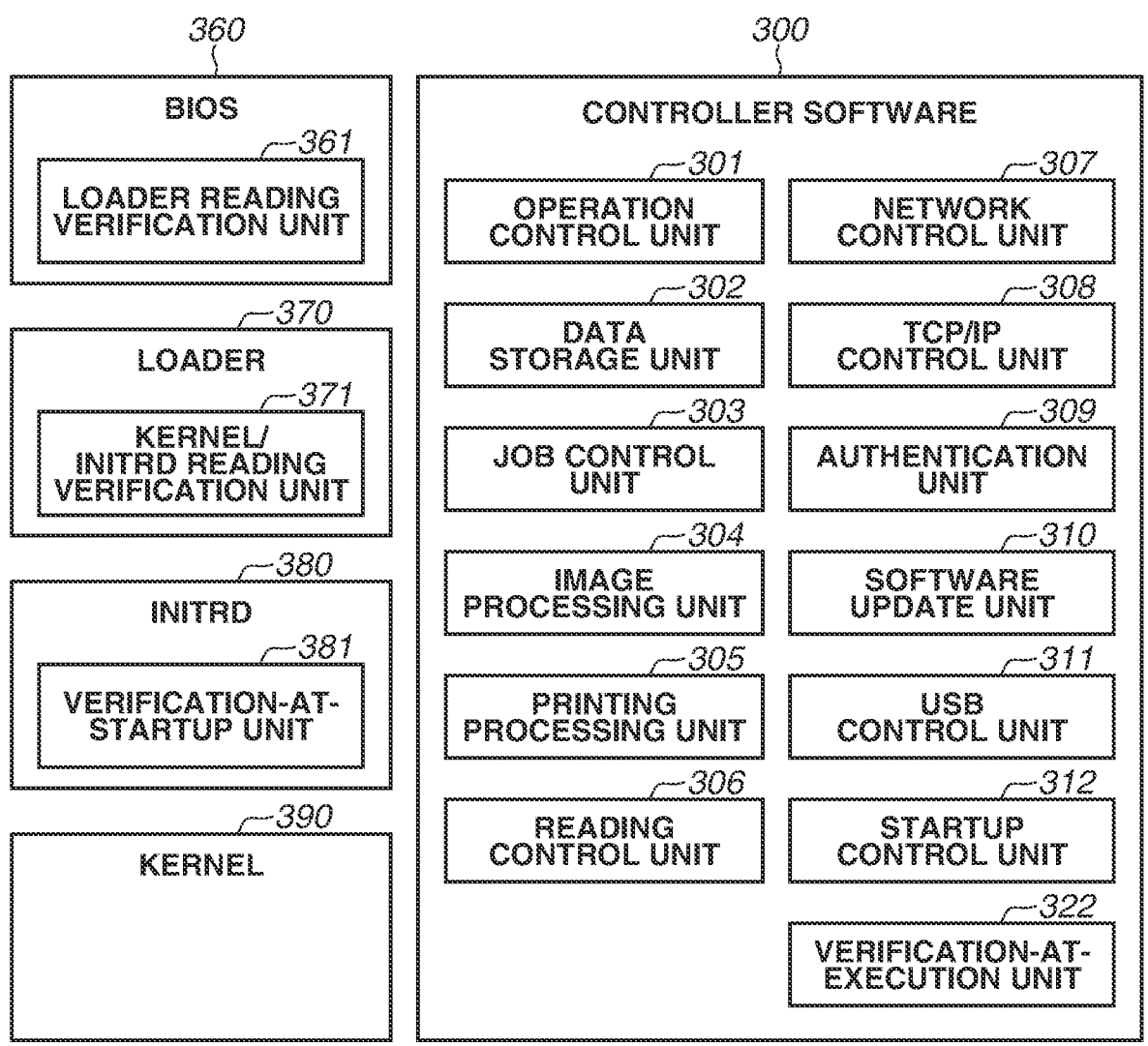
FIG. 3 is a block configuration diagram of software executed by the controller unit of the MFP according to the exemplary embodiment of the present invention.

FIG. 3 is a block diagram illustrating a configuration of software executed by the controller unit 101 of the MFP 100.

All software modules executed by the controller unit 101 are executed by the CPU 201. The CPU 201 executes a BIOS 360 stored in the ROM 220. The CPU 201 loads a loader 370, an initrd 380, and controller software 300 stored in the Flash ROM 211 into the DRAM 202, and executes the loader 370, the initrd 380, and the controller software 300. The BIOS 360 performs basic processing for the CPU 201 to control the I/O controller 203 and the DRAM 202. The BIOS 360 internally includes control software as the BIOS, and signature data corresponding to the control software. A loader reading verification unit 361 is included in the control software of the BIOS 360, and includes loader verification processing and a public key corresponding to a signature assigned to the loader 370. The BIOS 360 further includes processing of reading the loader 370 from the Flash ROM 211 and starting the loader 370. The loader 370 performs processing of reading a kernel 390 and the initrd 380 from the Flash ROM 211 and starting the kernel 390 and the initrd 380. The loader 370 internally includes control software as a loader and signature data corresponding to the control software. A kernel/initrd reading verification unit 371 is included in the loader 370, and includes processing of verifying the kernel 390 and the initrd 380, and public keys corresponding to signatures assigned to the kernel 390 and the initrd 380. The initrd 380 performs processing of reading the controller software 300 from the Flash ROM 211 and starting the controller software 300. The initrd 380 internally includes control software as initrd and signature data corresponding to the control software. A verification-at-startup unit 381 is included in the initrd 380, and includes processing of verifying all of the program files and the like constituting the controller software 300 at startup, and a public key corresponding to the assigned signature. A private key corresponding to all of the signature data is used only at development of the software and is not generally distributed.

An operation control unit 301 displays a screen image for the user on the operation unit 102, detects a user operation, and performs processing associated with each of screen parts such as a button displayed on the screen. A data storage unit 302 stores data in the Flash ROM 211 and reads data from the Flash ROM 211 in response to a request from another control unit. For example, in a case where the user wants to change any apparatus setting, the operation control unit 301 detects contents input to the operation unit 102 by the user, and the data storage unit 302 stores the contents as set values in the Flash ROM 211 in response to a request from the operation control unit 301. A network control unit 307 performs network setting such as an Internet protocol (IP) address on a transmission control protocol/internet protocol (TCP/IP) control unit 308 based on the set values stored in the data storage unit 302 at startup of the system or when detecting a setting change. The TCP/IP control unit 308 performs network packet transmission and reception processing via the network I/F 204 based on an instruction from another control unit. A job control unit 303 controls job execution based on an instruction from another control unit. An image processing unit 304 processes the image data into a format suitable for application, based on an instruction from the job control unit 303. A printing processing unit 305 prints and outputs an image on a paper medium via the printer I/F 207 based on an instruction from the job control unit 303. A reading control unit 306 reads a placed document via the scanner I/F 208 based on an instruction form the job control unit 303. An authentication unit 309 performs processing of determining whether an operator is an administrator with regard to operation requiring administrator authority. A software update unit 310 performs processing of updating the program files constituting the controller software 300 in an installed environment. A USB control unit 311 controls the USB I/F 209 and controls an apparatus connected via the USB. A startup control unit 312 controls startup of the program files constituting the controller software 300. The startup control unit 312 sequentially starts up the program files based on startup setting data described below. A verification-at-execution unit 322 includes processing of verifying all of the program files constituting the controller software 300 at execution. As a verification method by the verification-at-execution unit 322, there is a whitelist method in which a correct value list is previously stored, and the verification is performed by checking against the correct value list at execution of the program files. However, the present invention does not depend on a specific verification method by the verification-at-execution unit 322. Therefore, the verification method by the verification-at-execution unit 322 is not particularly limited.

For example, in the case where the copy function is performed, the operation control unit 301 detects a request for starting the copy function and instructs the job control unit 303 to perform copying. The job control unit 303 instructs the reading control unit 306 to read a document, thereby a scanned image is acquired. The job control unit 303 instructs the image processing unit 304 to convert the scanned image into a format suitable for printing. The job control unit 303 instructs the printing processing unit 305 to perform printing and outputting of a copy result.

Figure 4:
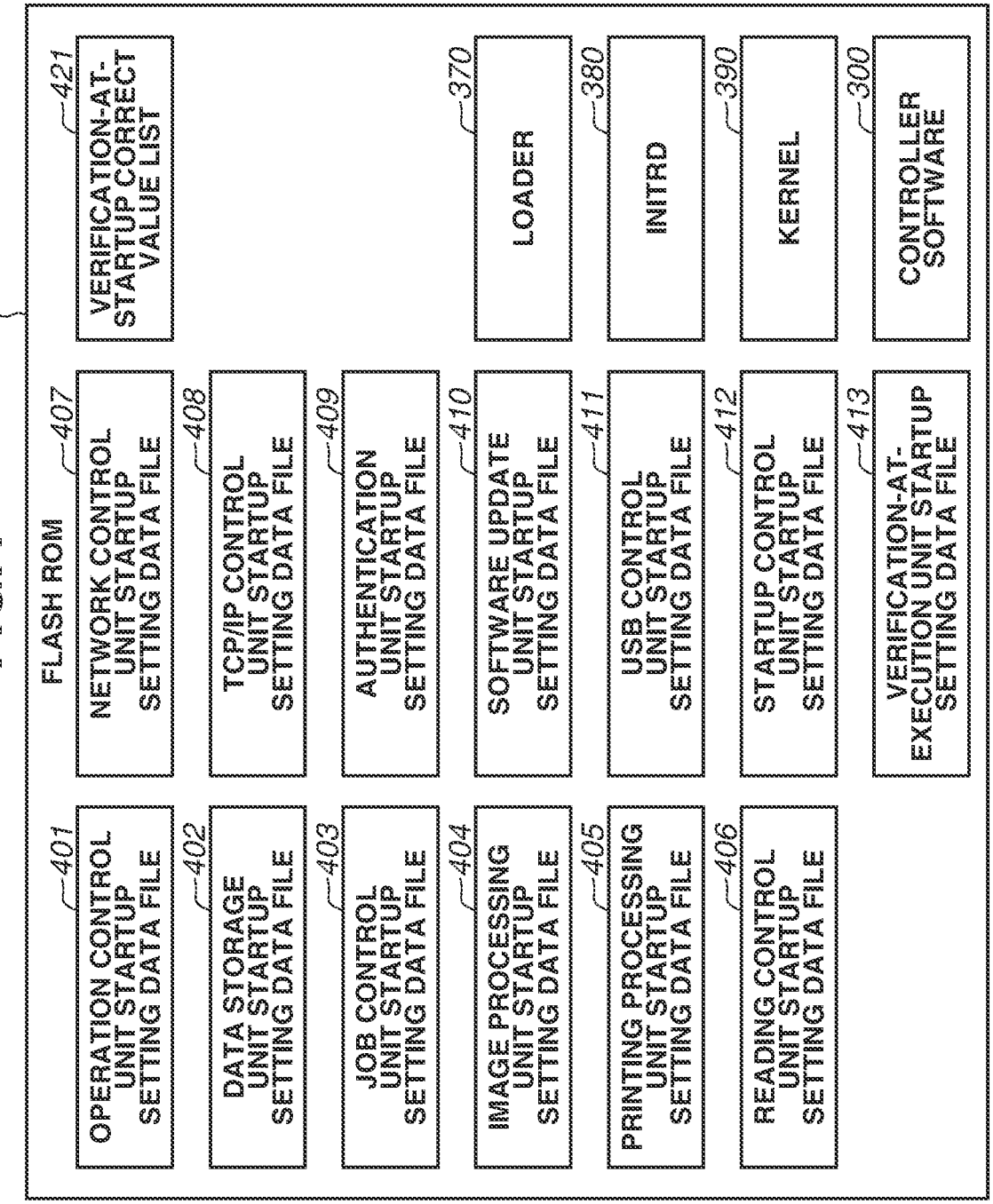
FIG. 4 illustrates a configuration example of data arranged in a Flash read only memory (ROM) according to the exemplary embodiment of the present invention.

FIG. 4 illustrates an example of data arranged in the Flash ROM 211.

The data includes an operation control unit startup setting data file 401, a data storage unit startup setting data file 402, and a job control unit startup setting data file 403. The data further includes an image processing unit startup setting data file 404, a printing processing unit startup setting data file 405, a reading control unit startup setting data file 406, and a network control unit startup setting data file 407. The data further includes a TCP/IP control unit startup setting data file 408, an authentication unit startup setting data file 409, a software update unit startup setting data file 410, and a USB control unit startup setting data file 411. Startup setting data including a startup control unit startup setting data file 412 and a verification-at-execution unit startup setting data file 413 is setting data used by the startup control unit 312 to control startup of the controller software 300. A verification-at-startup correct value list 421 is a correct value list used by the verification-at-startup unit 381 to perform verification processing.

In FIG. 3, the functional configuration of the software executed by the controller unit 101 is illustrated. The program files of the software excluding the BIOS 360 (i.e., the loader 370, initrd 380, kernel 390, and controller software 300) are stored in the Flash ROM 211.

While not illustrated, various kinds of setting data other than the startup setting data files, and various kinds of document data such as print data and scan data are also stored in the Flash ROM 211.

FIGS. 5A and 5B illustrate samples of the verification-at-startup correct value list 421 and the startup setting data files 401 to 413.

The verification-at-startup correct value list 421 is a list of combinations of a file name 501 and a hash value 502 for all of the program files included in the controller software 300. Contents of the data include at least a file name, a file location (position on directory), and a hash value calculated from the corresponding file. The verification-at-startup correct value list 421 further includes hash values of all of the startup setting data files relating to startup of the controller software 300 in addition to hash values of all of the program files included in the controller software 300.

Each of the startup setting data files 401 to 413 is a file that specifies set values relating to startup of the corresponding program file and defines how to start up the corresponding program for each controller software 300. Contents of each data file include information necessary for identification of a program to be started up (e.g., program file name 513), information necessary for execution (e.g., execution place 512), and information about execution timing (e.g., priority 514 and dependence 515). FIGS. 6A and 6B are diagrams respectively illustrating, as an example, startup setting data files 401a to 413a each including excerpted information about the execution timing, and a startup order of programs corresponding to the startup setting data files 401a to 413a. For example, the startup control unit startup setting data file 401a has "priority: initial startup, dependence: NONE". Thus, the startup control unit 312 is started up first. The data storage unit startup setting data file 402a has "priority: initial startup, dependence: startup control unit", and accordingly depends only on the startup control unit. Thus, the data storage unit 302 is started up next to the startup control unit 312. If a new startup setting data file having "priority: initial startup, dependence: startup control unit" is fraudulently added, a program corresponding to the added startup setting data file and the data storage unit 302 are started up at the same timing, which raises a possibility that a malicious program is started up before startup of the verification-at-execution unit 322. The present invention is directed to prevention of such fraud.

Figure 7:
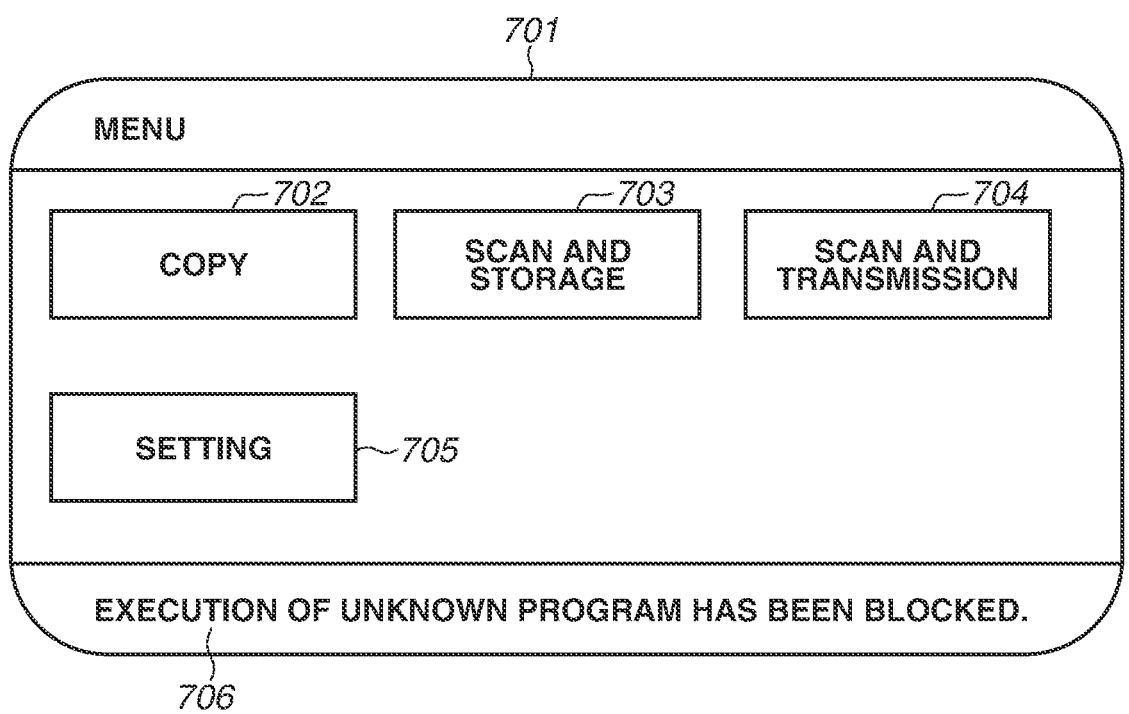
FIG. 7 is a screen configuration diagram relating to a menu according to the exemplary embodiment of the present invention.

FIG. 7 illustrates a menu screen 701 displayed on the operation unit 102. The menu screen 701 is used by the user to issue an instruction to execute various functions of the MFP 100. A button 702 is used by the user to issue an instruction to execute a copy function. A button 703 is used by the user to issue an instruction to execute a function of scanning and storing. A button 704 is used by the user to issue an instruction to execute a function of scanning and transmission. A button 705 is used by the user to issue an instruction to change an apparatus setting. When the button 705 is pressed, a setting screen 801 is displayed. A display area 706 displays various messages generated during operation of the apparatus to the user.

Figure 8:
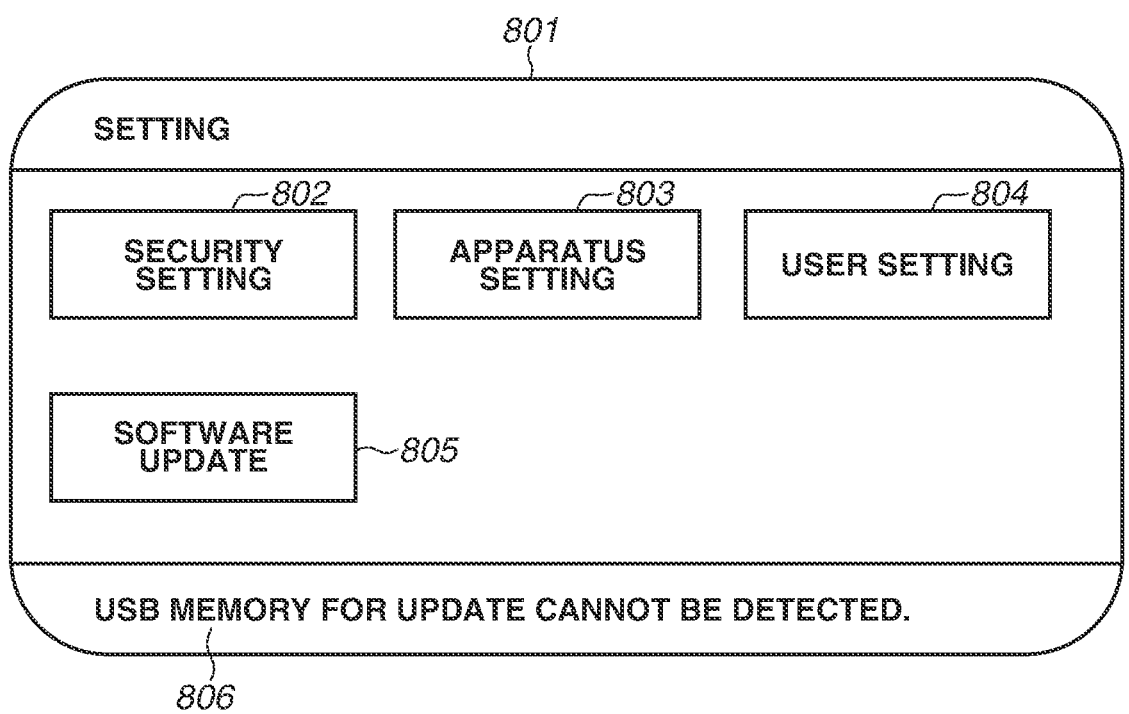
FIG. 8 is a screen configuration diagram relating to setting according to the exemplary embodiment of the present invention.

FIG. 8 illustrates the setting screen 801 displayed on the operation unit 102. The setting screen 801 is used by the user to issue an instruction on various settings. The screen includes no specific setting item and is an intermediate layer serving as a guide to a detailed setting item. When a button 802 is pressed, a security setting screen 1001 is displayed. When a button 803 is pressed, an apparatus setting screen (not illustrated) is displayed. When a button 804 is pressed, a user setting screen (not illustrated) is displayed. When a button 805 is pressed, software update is started. A display area 806 displays various messages generated during operation of the apparatus to the user.

Figure 9:
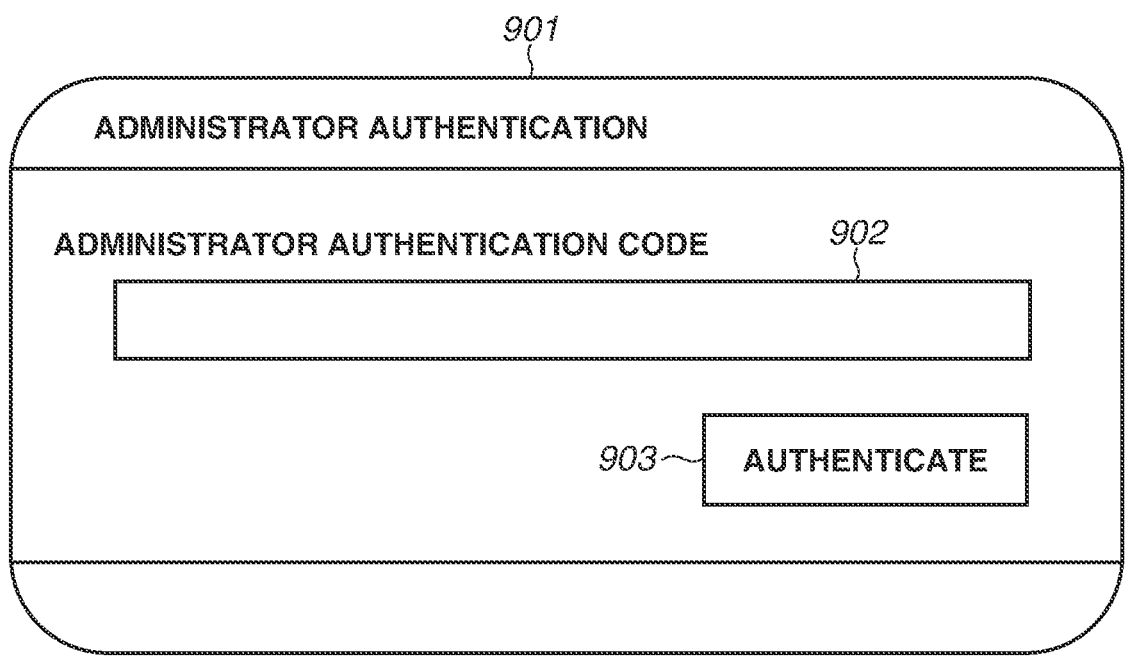
FIG. 9 is a screen configuration diagram relating to administrator authentication according to the exemplary embodiment of the present invention.

FIG. 9 illustrates an administrator authentication screen 901 displayed on the operation unit 102. The administrator authentication screen 901 is used by the user to input an administrator authentication code. The screen is displayed before execution of a function requiring administrator authority, and confirms that the operator has the administrator authority. For example, the screen is displayed before display of the security setting screen 1001, or after the button 805 is pressed and before software update is started. An area 902 is an area where the user inputs the administrator authentication code, and a button 903 is used to start confirmation of the administrator authentication code input in the area 902. The confirmation of the administrator authentication code is performed by the authentication unit 309. In a case where authentication is successful, the processing requiring the administrator authority is performed. In a case where the authentication fails, the processing requiring the administrator authority is canceled.

Figure 10:
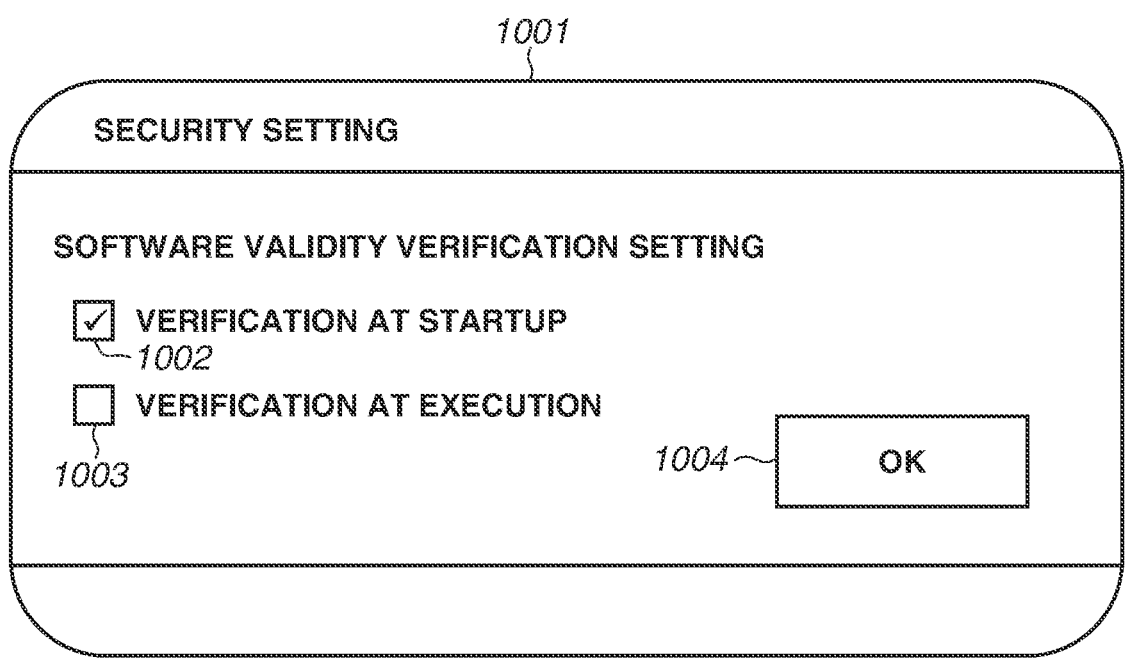
FIG. 10 is a screen configuration diagram relating to security setting according to the exemplary embodiment of the present invention.

FIG. 10 illustrates the security setting screen 1001 on which security setting of the MFP 100 is performed. In a case where verification at startup 1002 is selected, a verification-at-startup function, which is performed at startup of the system, is enabled. In a case where verification at execution 1003 is selected, a verification-at-execution function, which is performed at execution of the function, is enabled. When a button 1004 is pressed, a selected state of the security setting screen 1001 is stored as an apparatus setting in the data storage unit 302. The software verification processing in the verification-at-startup function and the verification-at-execution function needs a calculation time for verification. Thus, apparatus operation speed is deteriorated as compared with a case where verification is not performed. In other words, safety and processing performance are in a trade-off relationship. It is necessary for the administrator to perform the setting in consideration of operation, installation policy, and user satisfaction. While the MFP 100 is a multiuser device, the screen can be operated only by the operator having the administrator authority. All of the users are influenced by the setting, but only the administrator can perform the setting.

Figure 11:
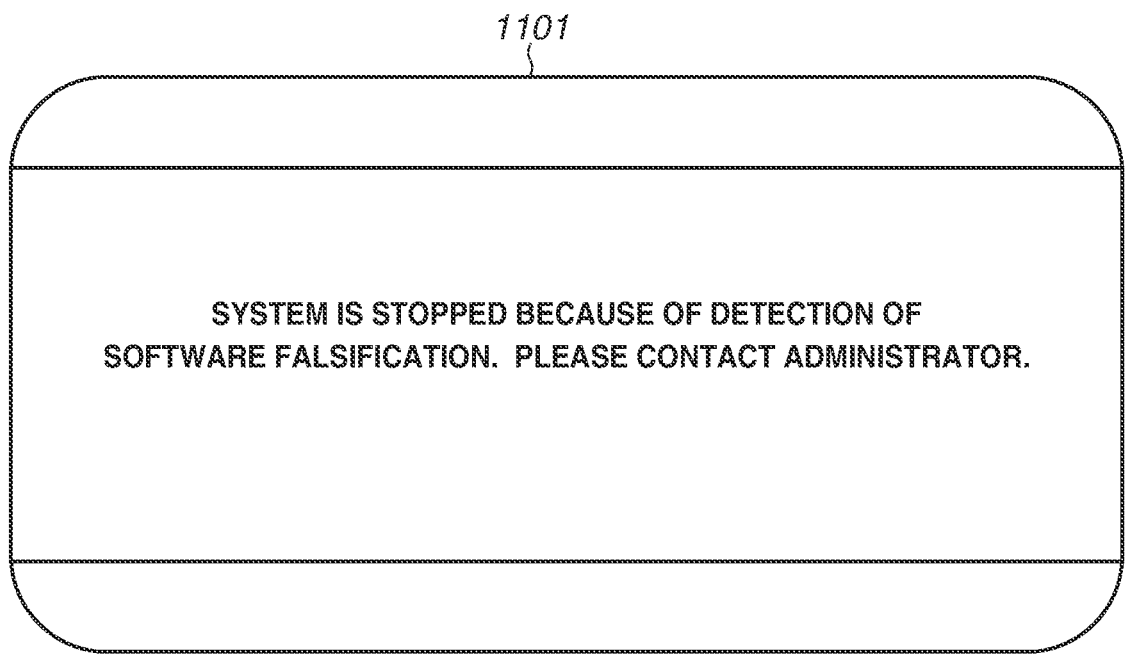
FIG. 11 is a screen configuration diagram relating to system stop caused by an error according to the exemplary embodiment of the present invention.

FIG. 11 illustrates an error screen 1101 displayed on the operation unit 102. The error screen 1101 notifies the user that firmware has been tampered with and the system has been stopped. Transition from the error screen 1101 to a normal function execution screen is not allowed, and the user will not use the MFP 100.

Figure 12A:
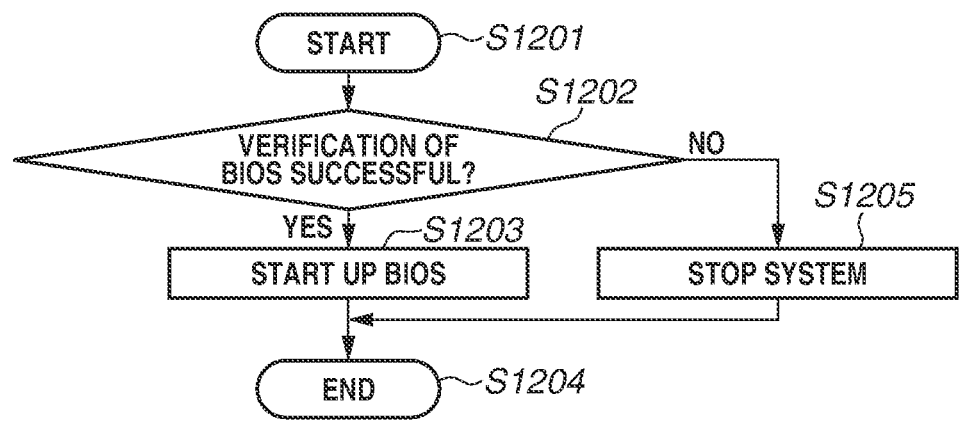
FIG. 12A is a flowchart of processing on an MFP side according to a first exemplary embodiment of the present invention.
Figure 12B:
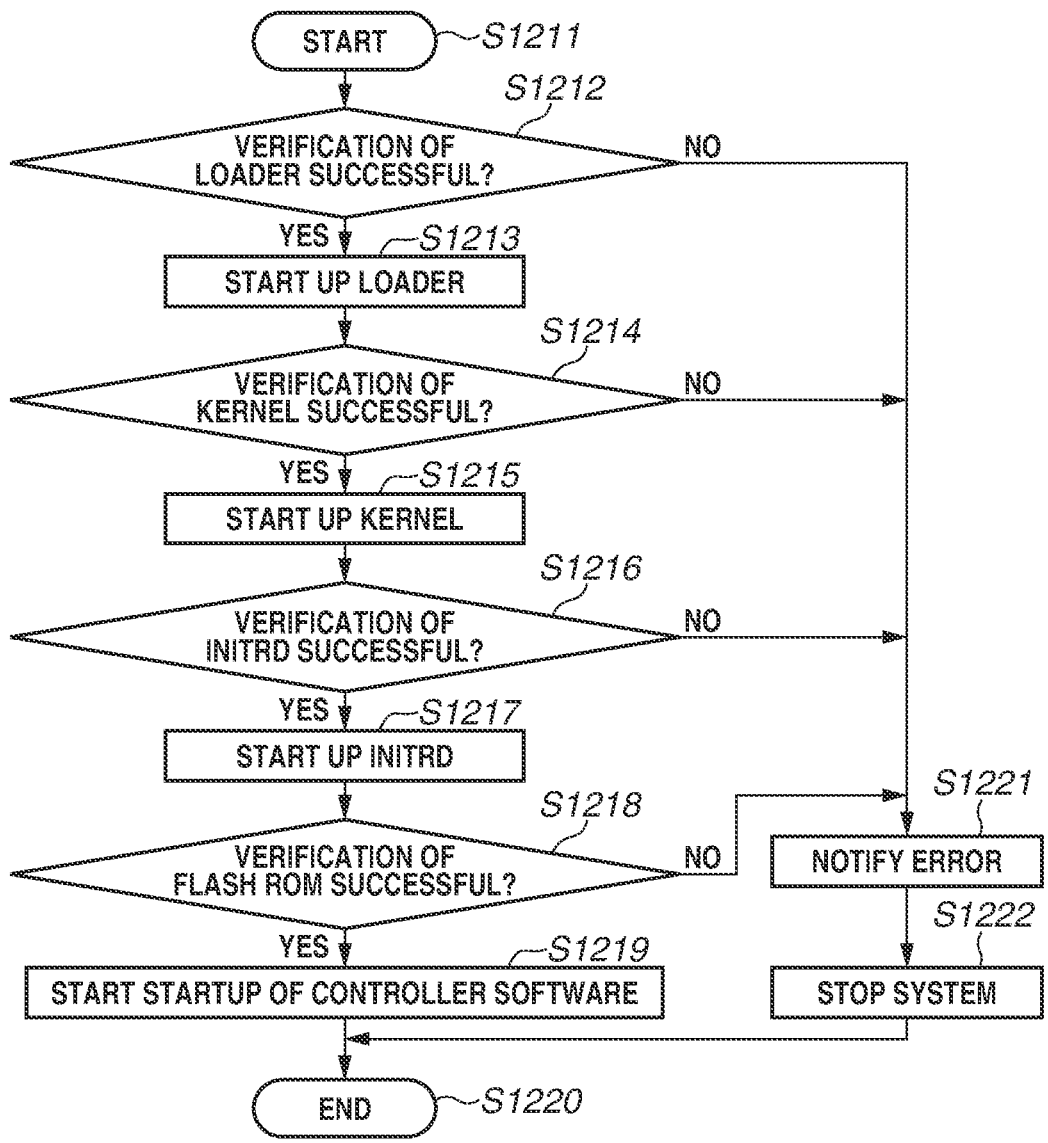
FIG. 12B is a flowchart of processing on an MFP side according to the first exemplary embodiment of the present invention.

A startup processing procedure of the MFP 100 and a processing procedure for verifying the program files and the like at startup are described with reference to FIGS. 12A and 12B. Verification processing in FIGS. 12A and 12B is performed only in a case where the verification at startup 1002 is selected. The processing is performed once every time the MFP 100 is started up. The processing performed by the MFP 100 illustrated in FIG. 12A is performed by the BIOS verification unit 221. In the following description, the verification processing in FIG. 12A is referred to as hardware verification. The processing performed by the MFP 100 illustrated in FIG. 12B is performed by the CPU 201 as calculation processing thereof after the CPU 201 loads programs stored in the Flash ROM 211 to the DRAM 202. In the following description, the verification processing in FIG. 12B is referred to as software verification. While the hardware verification and the software verification are both performed by the MFP 100, it is to be noted that units performing the verification are different from each other and the hardware verification is not the verification processing of the software executed by the CPU 201.

When power is supplied and startup processing is started, the BIOS verification unit 221 is started up, and the BIOS verification processing starts in step S1201.

In step S1202, the MFP 100 performs the verification processing of the BIOS 360, and checks whether the verification processing is successful. In a case where the verification processing is successful (YES in step S1202), the processing proceeds to step S1203. In a case where the verification processing fails (NO in step S1202), the processing proceeds to step S1205. In the verification processing, the BIOS verification unit 221 performs signature verification on a signature of the BIOS 360 read from the ROM 220 by using the public key placed in the BIOS verification unit 221. The verification at startup according to the exemplary embodiment of the present invention is the signature verification considering the startup order. The unit performing the signature verification performs the signature verification of the unit to be started up next to ensure security.

In step S1203, the MFP 100 instructs the CPU 201 to start up the BIOS 360.

In step S1205, the MFP 100 stops the system by canceling the startup sequence without starting up the BIOS 360. At this time, the BIOS verification unit 221 does not perform user notification because the BIOS verification unit 221 does not include a device for the user notification; however, a light emitting diode (LED) may be connected to the BIOS verification unit 221 and may emit light for notification.

In step S1204, the MFP 100 ends the verification processing of the BIOS 360.

The hardware verification is a verification method implemented by hardware. To tamper with the verification processing, it is necessary to tamper with an integrated circuit. Therefore, the verification method is extremely robust.

After the BIOS 360 is started up, the verification processing of the software arranged in Flash ROM 211 starts in step S1211.

In step S1212, the MFP 100 performs verification processing of the loader 370 by using the loader reading verification unit 361, and checks whether the verification is successful. In a case where the verification is successful (YES in step S1212), the processing proceeds to step S1213. In a case where the verification fails (NO in step S1212), the processing proceeds to step S1221. In the verification processing, signature verification is performed on a signature of the loader 370, which is the next startup object, read from the Flash ROM 211 using the public key held by the loader reading verification unit 361.

In step S1213, the MFP 100 starts up the loader 370.

In step S1214, the MFP 100 performs verification processing of the kernel 390 by using the kernel/initrd reading verification unit 371, and checks whether the verification is successful. In a case where the verification is successful (YES in step S1214), the processing proceeds to step S1215. In a case where the verification fails (NO in step S1214), the processing proceeds to step S1221. In the verification processing, signature verification is performed on a signature of the kernel 390, which is the next startup object, read from the Flash ROM 211 using the public key held by the kernel/initrd reading verification unit 371.

In step S1215, the MFP 100 starts up the kernel 390.

In step S1216, the MFP 100 performs verification processing of the initrd 380 by using the kernel/initrd reading verification unit 371, and checks whether the verification is successful. In a case where the verification is successful (YES in step S1216), the processing proceeds to step S1217. In a case where the verification fails (NO in step S1216), the processing proceeds to S1221. In the verification processing, signature verification is performed on a signature of the initrd 380, which is the next startup object, read from the Flash ROM 211 using the public key held by the kernel/initrd reading verification unit 371.

In step S1217, the MFP 100 starts up the initrd 380.

In step S1218, the MFP 100 performs verification processing of the Flash ROM 211 storing the controller software 300 by using the verification-at-startup unit 381, and checks whether the verification is successful. In a case where the verification is successful (YES in step S1218), the processing proceeds to step S1219. In a case where the verification fails (NO in step S1218), the processing proceeds to step S1221. The verification processing is performed on the next startup object read from the Flash ROM 211. In other words, the verification processing is performed on all of the program files included in the controller software 300 described in the verification-at-startup correct value list 421. Further, the verification processing is performed on the startup setting data files 401 to 413 relating to startup of the controller software 300, described in the verification-at-startup correct value list 421. The verification is performed on each file by comparing a hash value described in the verification-at-startup correct value list 421 with a hash value of the corresponding file that is read from the Flash ROM 211 and recalculated.

In step S1219, the MFP 100 starts startup of the controller software 300. The controller software 300 is divided into the plurality of program files. Thus, the program files necessary for startup of the system are sequentially started up. More specifically, the startup control unit 312 is first started up. The startup control unit 312 reads all of the startup setting data files 401 to 413, and determines the startup order based on the priority 514 and the dependence 515. For example, a program file having the highest priority 514 and no dependence 515 is determined as the most significant program file. Although other methods of determining the startup order may be considered, the exemplary embodiment of the present invention does not depend on a specific method of determining the startup order, and various determining methods are usable. The startup control unit 312 sequentially starts up the program files based on the determined startup order. During the startup of the controller software 300, the MIT 100 also starts up the verification-at-execution unit 322.

In step S1221, the MFP 100 notifies the user that tampering has been detected by displaying the error screen 1101 on the operation unit 102.

In step S1222, the MFP 100 stops the system by canceling the startup sequence.

In step S1220, the MFP 100 ends the verification processing of the software arranged in the Flash ROM 211.

The software verification is typically a verification method implemented by software. Thus, the verification method can be tampered with by rewriting the software in the storage unit. By previously verifying the software performing the verification by another component as in the above-described procedure, it is possible to guarantee that the verification method is not tampered with. Further, using the hardware verification at a starting point of the linked software verification makes it possible to guarantee that the entire system is not tampered with. Furthermore, the software verification is applied to startup of the verification-at-execution unit, which makes it possible to ensure robust reliability starting from the hardware verification against tampering after the startup of the system. In particular, in the controller software 300 including the plurality of divided program files, not only the program files but also the startup setting data files are previously verified, which makes it possible to ensure secure startup of the verification-at-execution unit.

Second Exemplary Embodiment

Figure 13:
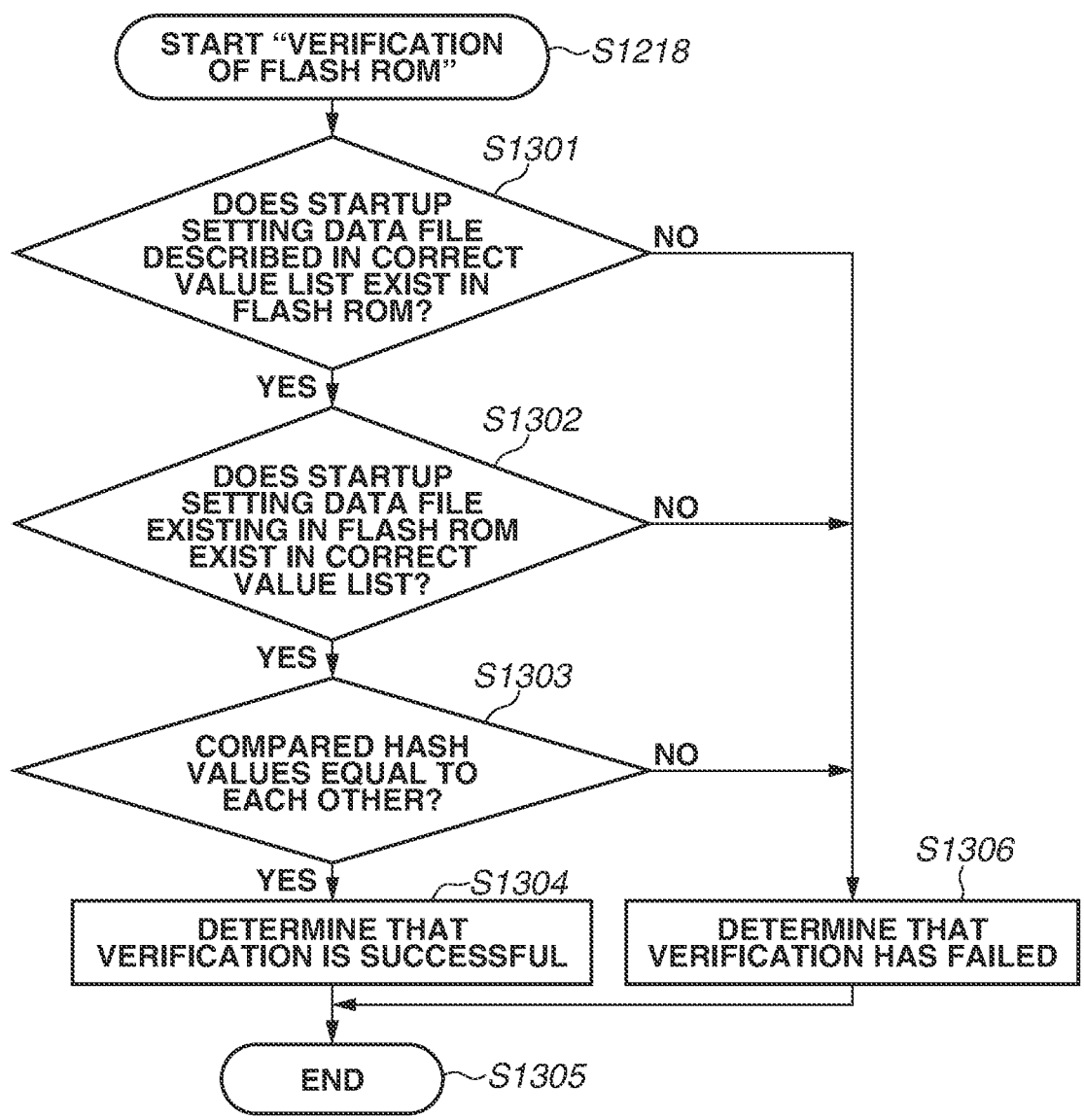
FIG. 13 is a flowchart of processing on an MFP side according to a second exemplary embodiment of the present invention.

A second exemplary embodiment of the present invention is described below with reference to FIG. 13. In the present exemplary embodiment, another mode of the verification processing performed on the startup setting data relating to startup of the controller software 300 in step S1218 is described. Descriptions of the configurations and the processing same as the configurations and the processing in the first exemplary embodiment are omitted.

In step S1301, the MFP 100 searches for the startup setting data files relating to the startup of the controller software 300 from the verification-at-startup correct value list 421 and verifies whether the searched startup setting data files exist in the Flash ROM 211. In a case where all of the searched startup setting data files exist in the Flash ROM 211 (YES in step S1301), the processing proceeds to step S1302. Otherwise (NO in step S1301), the processing proceeds to step S1306. As a method of searching for each of the startup setting data files from the verification-at-startup correct value list 421, there is a method that uses a directory name and an extension of the file name 501. Each of the startup setting data files can be searched by comparing whether a directory name matches the name of the directory holding the startup setting data file and comparing whether an extension matches the extension of the startup setting data file.

In step S1302, the MFP 100 searches for the startup setting data files 401 to 413 existing in the Flash ROM 211, and verifies whether the searched startup setting data files 401 to 413 exist in the verification-at-startup correct value list 421. In a case where all of the searched startup setting data files 401 to 413 exist in the verification-at-startup correct value list 421 (YES in step S1302), the processing proceeds to step S1303. Otherwise (NO in step S1302), the processing proceeds to step S1306. As a method of searching for the startup setting data files 401 to 413 from the Flash ROM 211, the method that uses the directory name and the extension can be used. A file having an extension matching the extension of each of the startup setting data files 401 to 413 can be searched from the directory holding the startup setting data files 401 to 413.

In step S1303, the MFP 100 performs verification by comparing the hash values. The method is similar to the method described in step S1215. Thus, description of the method in detail is omitted.

In step S1304, the MFP 100 determines that the verification of the Flash ROM 211 is successful. In step S1306, the MFP 100 determines that the verification of the Flash ROM 211 has failed.

By the above-described procedure, fraudulent deletion and fraudulent addition of the startup setting data files 401 to 413 can be detected. This enables detection of the controller software 300 that should be essentially started up but has not been started up, and a third-party program that should not be essentially started up, at the startup of the MFP 100. As a result, it is possible to achieve reliability at the startup of the MFP 100, namely, to achieve higher reliability in the verification at execution linked from the verification at startup.

Third Exemplary Embodiment

Figure 14:
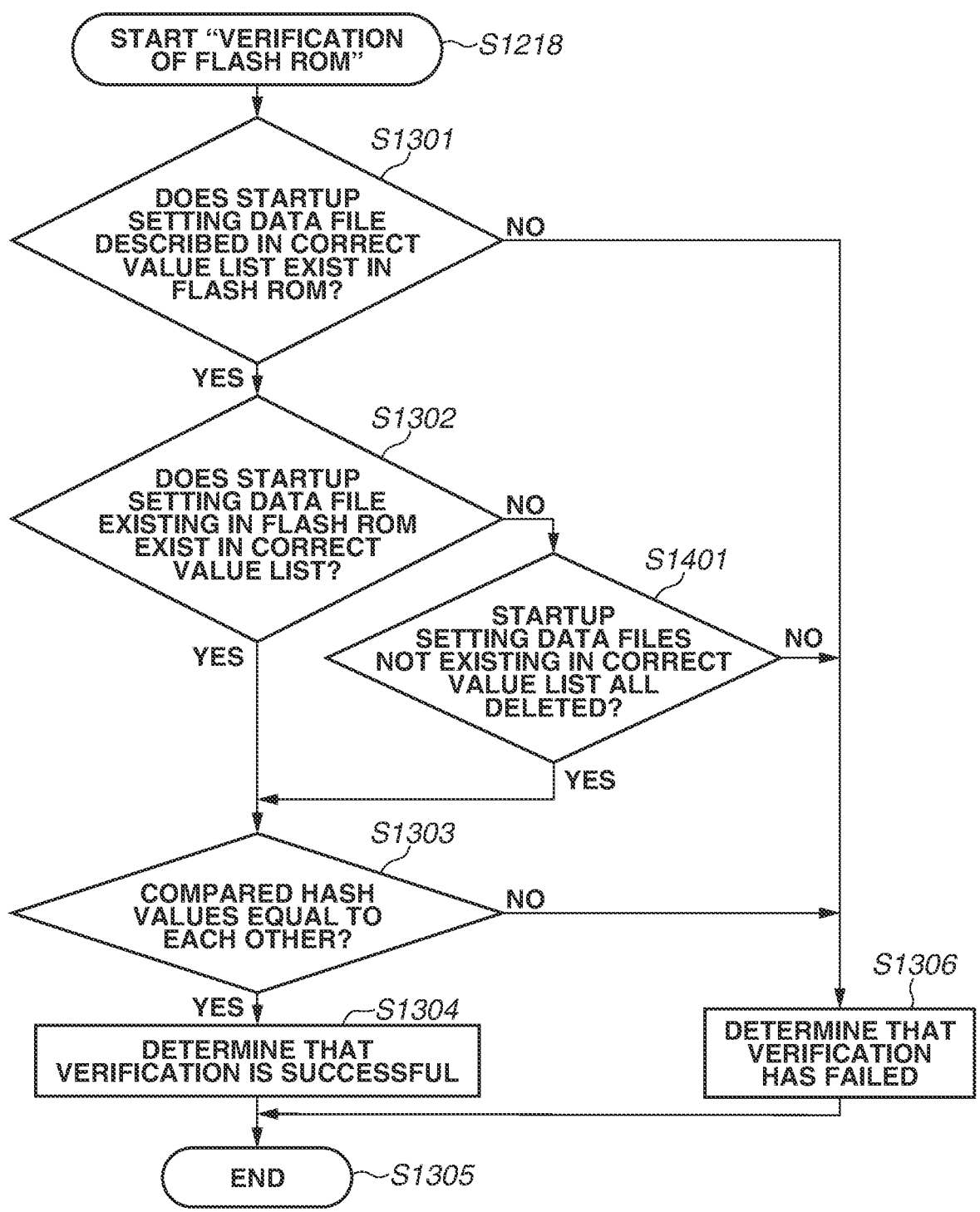
FIG. 14 is a flowchart of processing on an MFP side according to a third exemplary embodiment of the present invention.

A third exemplary embodiment of the present invention is described below with reference to FIG. 14. In the present exemplary embodiment, another mode of the verification processing performed on the startup setting data relating to startup of the controller software 300 in step S1218 is described. Descriptions of the configurations and the processing same as the configurations and the processing in the first or second exemplary embodiment are omitted.

The processing procedure in step S1302 is similar to the processing procedure in step S1302 according to the second exemplary embodiment. In a case where all of the searched startup setting data files exist in the verification-at-startup correct value list 421 (YES in step S1302), the processing proceeds to step S1303, as in the second exemplary embodiment. Otherwise (NO in step S1302), the processing proceeds to step S1401.

In step S1401, the MFP 100 deletes the startup setting data files 401 to 413 that exist in the Flash ROM 211 but do not exist in the verification-at-startup correct value list 421. In a case where deletion of all of the objective startup setting data files 401 to 413 is successful (YES in step S1401), the processing proceeds to step S1303. Otherwise (NO in step S1401), the processing proceeds to step S1306.

In the above-described procedure, in a case where fraudulent deletion of the startup setting data files 401 to 113 is not detected but only fraudulent addition is detected, the MFP 100 deletes the fraudulently-added startup setting data files 401 to 413. In a case where all of the objective startup setting data files 401 to 413 are deleted, the processing continues. As a result, as in the second exemplary embodiment, it is possible to achieve reliability at startup of the MFP 100, namely, to achieve higher reliability in the verification at execution led from the verification at startup, and to perform restoration if restorable, thereby improving an operation rate of the MFP 100.

The present invention can be realized by supplying programs that implement one or more functions of the above-described exemplary embodiments to a system or an apparatus via a network or a storage medium, and causing one or more processors of a computer in the system or the apparatus to read and execute the programs. Further, the present invention can be realized by a circuit (e.g., application specific integrated circuit (ASIC)) that implements one or more functions.

The present invention is not limited to the above-described exemplary embodiments, and various modifications and changes can be made without departing from the sprit and the scope of the present invention. Therefore, to make the scope of the present invention public, the following claims are attached.

According to the exemplary embodiments of the present invention, the reliability of the software controlling whole of the apparatus is improved by enhancing validity of the linkage of the verification at startup and the verification at execution. Therefore, the user can securely use the apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
   at least one processor; and
   at least one memory in communication with the at least one processor and having stored thereon instructions which, when executed by the at least one processor, cause the information processing apparatus to act as:
   a verification unit configured to verify, among a plurality of divided parts of software to be started up, a part of software to be started up next and setting data relating to startup of the part of software to be started next; and
   a startup unit configured to start a system of the information processing apparatus in a case where verification by the verification unit is successful,
   wherein the verification unit verifies the part of software by a method set to hardware at startup of the system, and
   wherein the verification unit verifies another part of software and setting data relating to startup of the other part of software by using the verified part of software.

2. The information processing apparatus according to claim 1, wherein the at least one processor causes the information processing apparatus to further act as a verification-at-execution unit configured to verify software executed at a certain timing before execution,
   wherein the verification unit verifies a part of software implementing the verification-at-execution unit and setting data relating to startup of the verification-at-execution unit.

3. The information processing apparatus according to claim 1, wherein the verification unit verifies fraudulent addition of another setting data and fraudulent deletion of the setting data in addition to verification of tampering of the setting data.

4. The information processing apparatus according to claim 3, wherein the at least one processor causes the information processing apparatus to further act as a deletion unit configured to delete the setting data,
   wherein, in a case where the verification unit detects that the setting data is not deleted but another setting data is fraudulently added, the deletion unit deletes the detected other setting data.

5. The information processing apparatus according to claim 1, wherein the verification unit verifies a startup order of the parts of software by verifying the setting data.

6. The information processing apparatus according to claim 5,
   wherein the setting data includes information defining the startup order of the parts of software, and
   wherein the verification unit verifies the startup order of the parts of software based on the information defining the startup order.

7. An information processing method comprising:
   causing a verification unit to verify, among a plurality of divided parts of software to be started up, a part of software to be started up next, and setting data relating to startup of the part of software to be started next; and
   starting a system of an information processing apparatus in a case where verification by the verification unit is successful,
   wherein the verification unit verifies the part of software by a method set to hardware at startup of the system, and
   wherein the verification unit verifies another part of software and setting data relating to startup of the other part of software by using the verified part of software.

8. A non-transitory computer-readable storage medium storing a program for causing a computer to be executed as an information processing method comprising:
   causing a verification unit configured to verify, among a plurality of divided parts of software to be started up, a part of software to be started up next, and setting data relating to startup of the part of software to be started next; and
   starting a system of an information processing apparatus in a case where verification by the verification unit is successful,
   wherein the verification unit verifies the part of software by a method set to hardware at startup of the system, and
   wherein the verification unit verifies another part of software and setting data relating to startup of the other part of software by using the verified part of software.

* * * * *